INVENTORS
William D. Carson
Leon F. Paul
Oscar H. Smith
Richard O. Wilkins

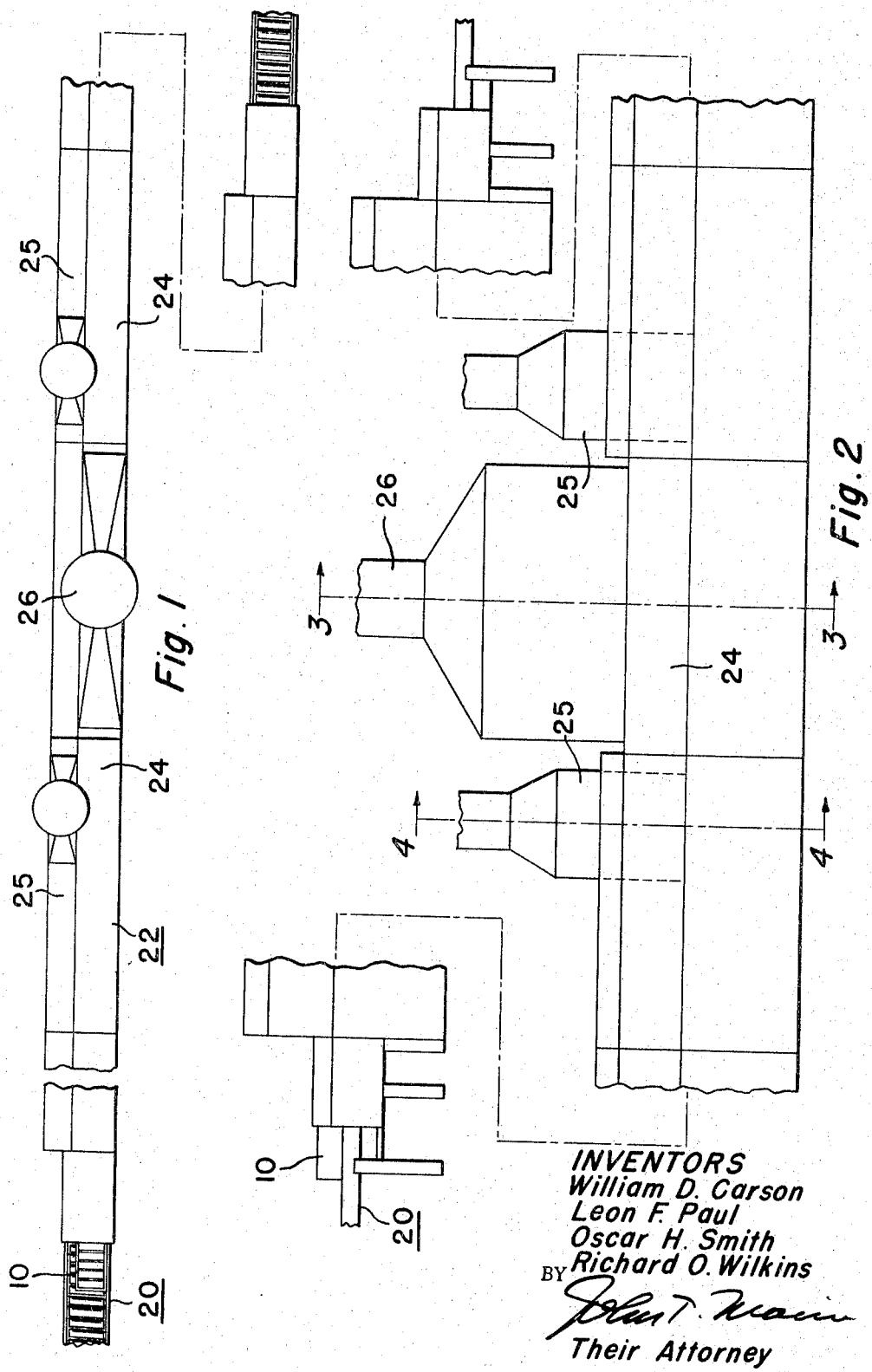

BY
Their Attorney

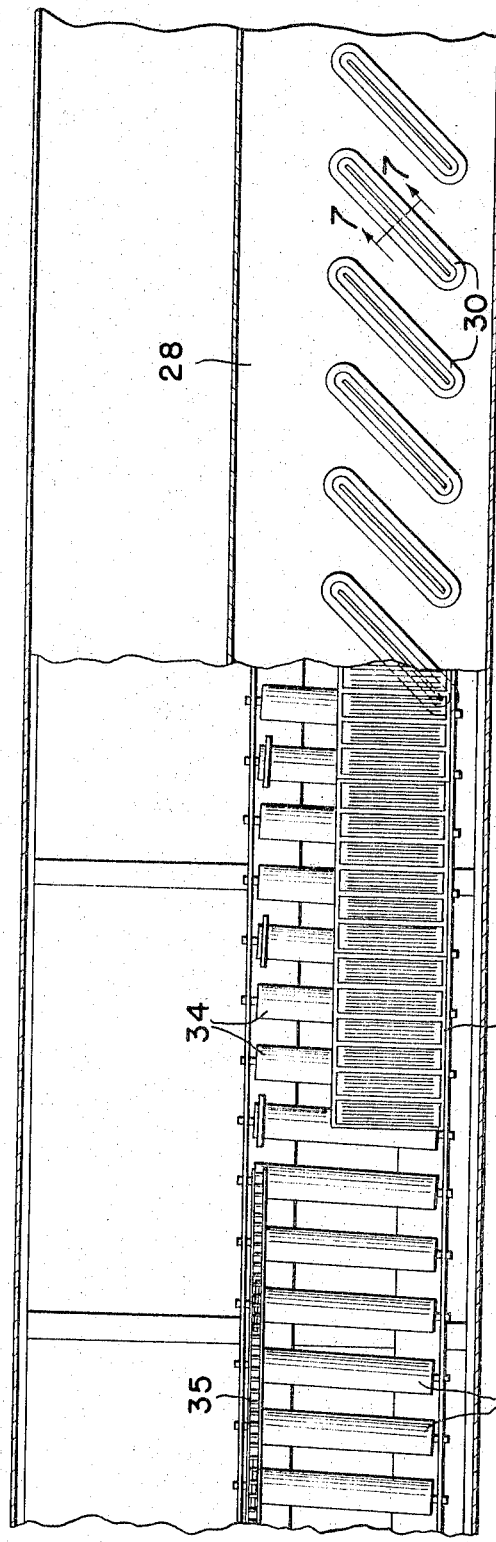
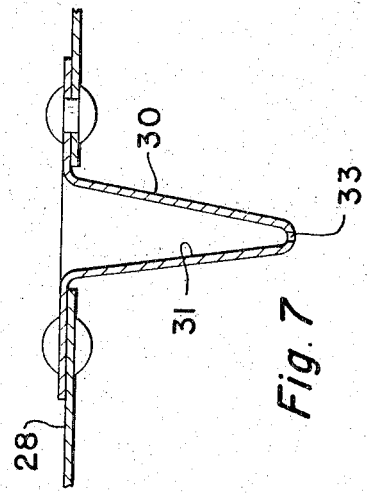
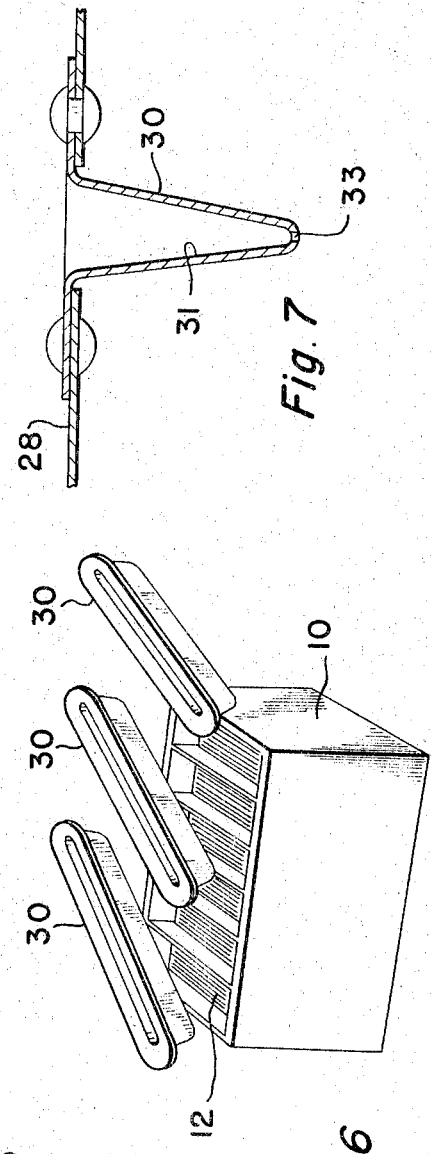
INVENTORS
William D. Carson
Leon F. Paul
Oscar H. Smith
Richard O. Wilkins 3,314,158
STORAGE BATTERY
William D. Carson and Leon F. Paul, Muncie, and Richard O. Wilkins, Anderson, Ind., and Oscar H. Smith, Old Bridge, N.J., assignors to General Motors Corporation, Detroit, Mich., a corporation of Delaware
Filed Nov. 19, 1965, Ser. No. 508,758
14 Claims. (Cl. 34—21)

This invention relates to lead acid storage batteries and is particularly concerned with the drying of fully charged, washed, and assembled storage battery elements within the battery case.

The manufacture of dry charged storage batteries creates economic problems in the drying of plate assemblies after they have been charged. If these plate assemblies are not thoroughly dried after charging, the battery loses its charge during storage and, upon subsequent addition of battery acid, is incapable of performing the desired functions.

Until now, the only satisfactory method for producing dry charge battery assemblies was to process each cell group or assembly separately. Under the prior art procedures, the cell groups which comprise positive and negative plates with separators therebetween were immersed in battery acid, charged, washed free from acid and were then placed in a heating chamber and dried in a nonoxidizing atmosphere. Thereafter, the cell groups, in dried condition, were assembled into battery cases, sealed and connected electrically.

This prior process was not only costly but in many instances the dried and charged cell assemblies were injured during the assembly thereof into the case due to the compression necessary to fit each cell group within its cell compartment, separators in some instances were displaced during the various operations and in general the entire procedure was tedious and costly.

Furthermore, in some of the newer types of storage batteries such as the batteries shown in Doyle et al. Patent 2,942,055, additional problems are created when the cell groups are charged separately due to the necessity of subsequently assembling the cell groups in the battery together with the specific operations required to connect electrically the groups in series through the several partitions between the cells.

The present invention is directed to a method for charging completely assembled storage battery units wherein the individual cell groups in each battery are connected one to another and charged as a unit. The acid is thereafter dumped from the battery cell compartments, the cell groups while in position are thoroughly washed and subsequently dried in the case under controlled conditions to produce a dry charged unit at a greatly reduced cost and with much less opportunity for damage to the cell groups.

This invention is specifically directed to the drying of storage batteries having through-the-wall connections between the several cell groups, as shown in said Doyle et al. patent supra. In copending application Ser. No. 508,-757, filed concurrently herewith, an apparatus and method for drying assembled batteries is described and claimed wherein the cell groups are connected externally of the cell case.

It is, therefore, the main object of the present invention to provide a method and apparatus for drying completely a plurality of charged wet cell groups within a battery case wherein the cell groups are electrically connected one to another by means of permanent, through-the-wall connectors and wherein the cover for the battery is applied after the drying operation is completed.

In carrying out this object, it is a further object to continuously sweep the wet cell assemblies with hot nonoxidizing gases having a dew point preferably of from 120° F. to 140° F. over an extended period wherein the sweep of gas is supplied from a plurality of linear nozzles set at an angle to the direction of travel of the battery case and wherein the gas is directed into the battery cell compartments at high velocity and at elevated temperature.

In carrying out this object, it is a further object to supply the gas for drying the battery at velocities above 12,000 ft. per minute and preferably in the order of 21,000 ft. per minute.

A further object of the invention is to provide a method for drying battery plate cell assemblies in assembled condition within an open top battery case wherein the drying is accomplished through the use of hot, relatively dry, high velocity nonoxidizing atmosphere which penetrates into each battery cell and which is driven through the separators and plate assemblies to eliminate moisture therefrom.

Further objects and advantages will be apparent, reference being had to the accompanying drawings wherein preferred embodiments of the present invention are clearly shown.

FIGURE 1 is a plan view of a drying oven;

FIGURE 2 is a side elevation of the drying oven shown in FIGURE 1;

FIGURE 5 is a view partly cut away of the positive plenum chamber showing some batteries in position on the conveyor and also showing some of the nozzles used in connection with the drying step;

FIGURE 6 is a diagrammatic view showing a storage battery with three nozzles positioned thereover showing the angled arrangement thereof for sweeping the gas through the several battery cells; and FIGURE 7 is a sectional view through one of the nozzles.

Figures 3, 4:
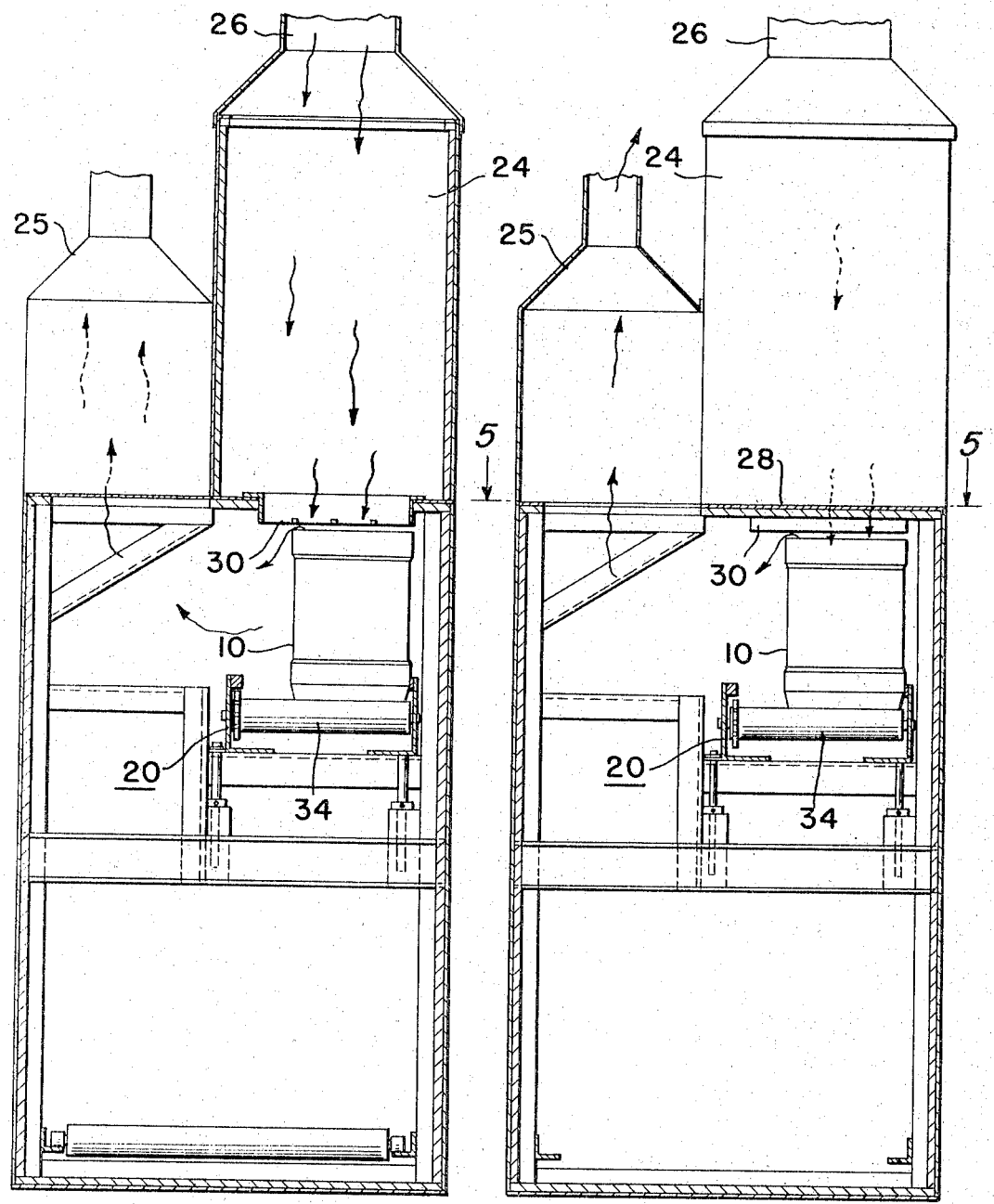
FIGURE 3 is a section taken on line 3—3 of FIGURE 2 showing an end view showing the oven with a battery in place upon the conveyor within the positive plenum chamber.
FIGURE 4 is a view taken on line 4—4 of FIGURE 2 showing a return gas or negative plenum chamber in more detail.

In the manufacture of dry charged storage batteries of the type described, the cell groups are assembled in storage battery cases and the internal electrical connections are made through the walls of the several cells. In a 12 volt battery, for example, there are six cells and six cell groups with the end cells each carrying one of the battery terminals and with the intermediate cells connected in series therebetween. In this type of battery the cell cover is left off the battery during charging and drying and is assembled thereto after the battery is fully charged and dried, whereby it is only necessary to seal the cell cover in place with the two terminals passing through apertures in the cover to complete the battery assembly.

In the charging of such batteries, the battery cell compartments with the cell groups therein are filled with battery acid and are connected in a charging circuit generally in series with a number of other batteries. The batteries are fully charged and then the acid is dumped therefrom and the cell groups and compartments are washed by passing the batteries through a washing apparatus which completely eliminates the battery acid from the interstices of the plates or separators. Generally, the washing consists of 14 successive washes with water ranging in temperature from 140° F. to 110° F., together with a final wash of cold tap water. Between each wash, the wash water in the batteries is dumped and the batteries are held in a partiallly inverted position to drain the wash water therefrom. Each drain requires about 45 seconds except for the final drain wherein a four minute period is used to eliminate all water from the battery cell compartments and cell assemblies that will drain therefrom by gravity.

Thereafter, the charged, washed and drained batteries 10 are positioned on a conveyor 20 shown in FIGURE 1 at the left-hand side of the figure. These batteries then pass into the drying oven 22 through the positive plenum chamber 24 thereof. The conveyor passes completely through the chamber 24 and emerges therefrom at the right-hand end at which time the batteries 10 together with cell groups 12 are completely dried.

The positive plenum chamber 24 is supplied hot gasses through a duct 26 at the center of the chamber. These recirculating gases pass and are supplemented by a direct gas fired burner adjusted so as to produce an atmosphere containing not over .2% oxygen, 2–5% carbon monoxide and 8–11% carbon dioxide. This atmosphere is moved from the burner to the positive plenum chamber 24 of the oven 22 by a centrifugal blower which is capable of supplying large quantities of the nonoxidizing atmosphere at high velocity. The gas is supplied to chamber 24 at a temperature of from 240–250° F. with a dew point of 130° F. ± 10.

The chamber 24 is closed at the lower side thereof by a continuous plate 28 which extends the entire length thereof. This plate is provided with a plurality of narrow angled slits or apertures through which nozzles 30 pass and are fixedly positioned. The nozzles 30 as will be seen in FIGURES 5, 6 and 7 are positioned at an angle to a conveyor 20 which passes beneath the plate 28. The conveyor 20 is formed from a plurality of rotatable rollers 34, the axes of which are slightly angled as shown in FIGURE 5 so that batteries 10 placed on the conveyor will always be moved against the right hand side thereof with respect to the direction of travel. The conveyor 20 is driven by a chain drive 35 or other suitable means, to provide positive and timed movement thereof. The rollers 34 are slightly longer than the width of the widest battery case to be passed through the oven and are thus capable of accommodating a full range and variety of battery cases. It will also be noted that the nozzles 30 are also longer than necessary for the batteries 10 as shown in FIGURE 5 whereby wider batteries may be fed through the same apparatus and the nozzles will be adequate to sweep the cells with the high velocity gas. Thus, the wide conveyor rollers and the long nozzles 30 permit the use of the drying apparatus in connection with a number of different size batteries 10 which may be run simultaneously and intermingled one with the other without difficulty and add to the flexibility of the apparatus. We prefer to have the nozzles 30 located with their throats positioned one-half inch or less above the batteries. This clearance is provided to aid flexibility of the apparatus. If all batteries were of identical height, the nozzles 30 could be positioned within 1/8 inch of the top of the battery cases. It will be noted from the cross section of the nozzle 30 shown in FIGURE 7 that the throat 31 thereof is angled toward its outlet 33 so as to increase the velocity of the atmosphere passing therethrough. In this connection, the dimensions of the nozzles 30 may vary in accordance with the total area of the nozzle outlets 33 to be compatible with the capacity of the blower system.

As the batteries 10 move along the conveyor 20 toward the right-hand end of the oven chamber 22, the hot gasses from the positive plenum chamber 24 pass through the nozzles 30 and are driven into the cell compartments and between the plates and separators to evaporate the moisture therein and thus dry completely the cell assemblies. The sweeping action of the gases, as a battery case passes each successive nozzle, aids in driving the gases into the cell compartments and between the plates and separators.

We have found that it is important that high velocity is maintained throughout this drying process and we prefer to use a nozzle velocity of about 21,000 ft. per minute which is accomplished by maintaining a positive plenum pressure of about 16 oz. per square inch in this specific embodiment. The apparatus is completely functional within the preferred range of velocities of from 20,000 to 22,000 feet per minute and up as high as 40,000 per minute; drying may also be obtained at velocities down to 12,000 feet per minute although longer periods of time are required in order to obtain satisfactory drying. The gas that is forcibly blown into each cell compartment acts to eject residual gas from the cell compartments as the batteries pass successive nozzles and this residual gas which is cooled and moisture laden is then forced into the negative plenum chamber 25 as shown by the arrows in FIGURES 3 and 4. The negative plenum chamber recirculates the return gas through a condenser which is cooled so as to reestablish the dew point of the gas to within the range of about 120° F. to 140° F. whereupon the gas is recirculated through the booster and is reheated and supplemented by fresh nonoxidizing atmosphere from the burner. Thus, the process is a continuous one wherein close control of the dew point of the drying gas is maintained at all times and wherein the high velocity of the drying gas is a basic and important factor in the drying of the assembled cell groups within their cases.

We have found that with a drying chamber about 110 feet long and utilizing 198 nozzles having outlets 9" long and 1/16" wide with the nozzles spaced 6¼" apart and angled at 45° to the axis of travel of the batteries that the rate of movement of batteries on the conveyor should be adjusted so that each battery is within the drying zone for a minimum of 90 minutes, this time figure being directed to batteries with microporous rubber separators therein. In this connection, the nonoxidizing gas is supplied at about 250° F. with a nozzle velocity of 21,000 ft. per minute at a dew point of 130° F.±10° F. and having a nominal analysis of Oxygen less than 0.2 of 1%
$CO_2$—about 10%
CO—about 2.5%
$N_2$—the remainder For batteries having paper separators, the period of time may be cut down considerably to in the order of from 20 to 30 minutes, since the paper separators dry more readily. In any event, the conveyor speed should always be adjusted so that the plates and separators are completely dry when any battery leaves the drying oven.

The batteries, upon leaving the oven, should have the battery covers assembled thereto. If the covers are not assembled to the battery immediately, it is possible to store the batteries in dried condition at an ambient temperature of between 105° and 120° F. provided the relative humidity of the surrounding atmosphere is maintained at not in excess of 35%. However, in most instances, the covers should be sealed into place with the vents sealed as quickly as possible to prevent any moisture pickup by the dried plates and separators.

We consider the high velocity nozzles directing drying atmosphere into the cell compartments and between the plates the major factor to the success of this invention. We have found that it is impractical to dry battery assemblies in the case satisfactorily unless the drying atmosphere is injected into the cell compartments at a high velocity whereby the atmosphere is forced between the plates and separators and into the interstices thereof to provide complete drying of the same. As mentioned heretofore, velocities of less than 12,000 feet per minute do not provide acceptable drying since the time period to obtain complete drying is excessive and too costly and wherein in many instances due to the lower velocities it is impossible to fully dry the plates and separators adjacent the bottom of the case.

The gas booster may be of any satisfactory design and in this connection, a high pressure centrifugal fan is used to produce the high velocity supply of atmosphere. This is preferably of a squirrel cage design capable of moving large volumes of air in order to obtain the desired velocities through the nozzles.

While the embodiments of the present invention as herein disclosed constitutes preferred forms, it is to be understood that other forms might be adopted.

What is claimed is as follows:

1. In a method for drying a plurality of open top battery assemblies, each consisting of a battery case having a plurality of contiguous open top compartments wherein each compartment includes a wet, fully charged battery plate assembly consisting of positive and negative battery plates spaced from one another by permeable separators and connected electrically to the battery plate assembly in the next adjacent compartment, the steps comprising; providing a plurality of open top battery assemblies along a conveyor, concurrently blowing hot, dry, non-oxidizing gas at high velocity into said open top assemblies from a plurality of spaced nozzles set angularly to the direction of movement of said assemblies whereby the open top compartments and battery plate assemblies therein are progressively swept with said gas, continuously withdrawing cooled, less dry gas from said assemblies, and continuing the procedure until said battery plates are dried.

2. In a method for drying a plurality of wet, fully charged battery plate assemblies permanently, electrically connected together and contained within a plurality of contiguous compartments within an open top battery case, the steps comprising; confining said battery case with said plate assemblies therein within a chamber, continuously blowing high velocity, hot, dry non-oxidizing gas into said case and sweeping across the open top thereof so that the gas is driven progressively from one side to the other of said compartments and between the components of the battery plate assemblies, continuously withdrawing cooled, less dry gas from said chamber at a point remote from the battery case, and continuing said procedure until the battery plate assemblies in said case are completely dry.

3. In a method for drying a plurality of wet, fully charged battery plate assemblies permanently, electrically connected together and contained within a plurality of contiguous compartments within an open top battery case, the steps comprising; confining said battery case with said plate assemblies therein within a chamber, continuously blowing high velocity, hot, dry, non-oxidizing gas into said cases and sweeping across the open top of said compartments so that the gas is driven progressively from one side to the other of said compartments and between the components of the battery plate assemblies, continuously withdrawing cooled, less dry gas from said chamber at a point remote from said battery case, drying and reheating said withdrawn gas, and then recirculating the same through said chamber while simultaneously adding make up hot dry gas to maintain the volume thereof.

4. In a method for progressively drying a plurality of open top battery assemblies each consisting of a battery case having a plurality of contiguous open top compartments therein wherein each compartment includes a wet, fully charged battery plate assembly consisting of positive and negative battery plates spaced from one another by permeable separators suitably connected electrically and wherein each battery plate assembly is electrically connected to the battery plate assembly in the next adjacent compartment, the stepus comprising; moving a plurality of open top battery assemblies longitudinally along a conveyor, concurrently sweeping hot, dry, nonoxidizing gas at high velocity into the said open top assemblies from a plurality of longitudinally spaced nozzles set angularly to the direction of movement of said assemblies whereby the open top compartments and the battery plates assemblies therein are progressively swept with gas from said nozzles in the direction of movement of said conveyor, and continuing the movement of said batteries along said conveyor and the sweeping of gas therein until all of the battery plates in said battery assemblies are progressively dried, and then progressively removing said dried battery assemblies from said conveyor.

5. In a method for progressively drying a plurality of open top battery assemblies each consisting of a battery case having a plurality of contiguous open top compartments therein wherein each compartment includes a wet, fully charged battery plate assembly consisting of positive and negative battery plates spaced from one another by permeable separators suitably connected electrically and wherein each battery plate assembly is electrically connected to the battery plate assembly in the next adjacent compartment, the steps comprising; moving a plurality of open top battery assemblies longitudinally along a conveyor, concurrently sweeping hot, dry, nonoxodizing gas at high velocity into the said open top assemblies from a plurality of longitudinally spaced nozzles set angularly to the direction of movement of said assemblies whereby the open top compartments and the battery plate assemblies therein are progressively swept with gas from said nozzles in the direction of movement of the conveyor, continuously withdrawing cooled, less dry gas from said assemblies and replacing same with hot, dry, nonoxidizing gas, and continuing said procedure and the sweeping of gas therein until all of the battery plates in said battery assemblies are progressively dried, and then progressively removing said dried battery assemblies from said conveyor.

6. The method as claimed in claim 5 wherein said withdrawn gas is reheated and then recirculated through said nozzles.

7. The method as claimed in claim 4 wherein the velocity of the gas coming from said nozzles is in the order of above 12,000 feet per minute.

8. The method as claimed in claim 7 wherein the velocity of the gas coming from said nozzles is preferably in the order of above 21,000 feet per minute.

9. The method as claimed in claim 4 wherein the gas is supplied at a temperature of about 250° F. with a dew point of 130° F. ±10°.

10. The method as claimed in claim 8 wherein the said gas is maintained at a temperature of about 250° F. with a dew point of about 130° F. ±10°.

11. Apparatus for drying open top battery assemblies each consisting of an open top battery case having a plurality of contiguous open top compartments therein wherein each compartment includes a fully charged battery plate assembly suitably comprising; a conveyor for carrying batteries in a longitudinal direction, confining means for said conveyor forming a longitudinally extending chamber which is connected to an outlet duct, a plurality of spaced constricted openings in said chamber and above said conveyor and adapted to direct gas into the open top compartments of batteries carried on said conveyor, an inlet duct connecting all of said elongated openings, and means for supplying hot dry gas under pressure to said inlet duct whereby the gas is directed through said openings toward said conveyor and is subsequently drawn into said outlet duct.

12. Apparatus as claimed in claim 11 wherein the system is a closed system including a gas generator and fan between the outlet duct and the inlet duct.

13. Apparatus as claimed in claim 11 wherein said elongated nozzles are positioned at an angle to the main axis of movement of said conveyor.

14. Apparatus as claimed in claim 13 wherein said elongated nozzles include constricted throats for increasing the velocity of gas being forced therethrough.

References Cited by the Examiner
UNITED STATES PATENTS

| 2,702,435 | 2/1955 | Pinney | 34—105 |
| 2,891,319 | 6/1959 | Beyol | 34—21 |
| 2,911,457 | 11/1959 | Sabatino | 34—224 X |

KENNETH W. SPRAGUE, *Primary Examiner.*